A. Larrowe.
Rolling Gate.
No. 59,416. Patented Nov. 6, 1866.
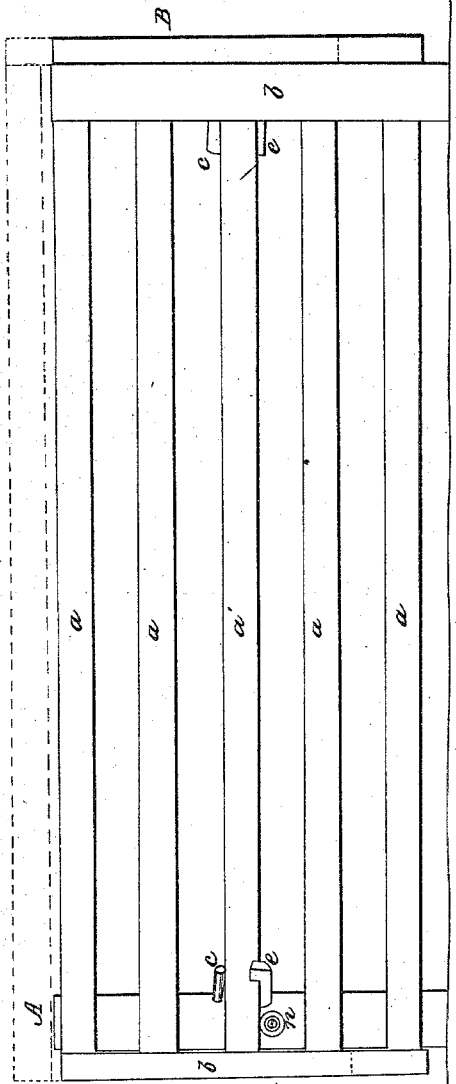
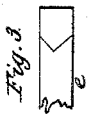
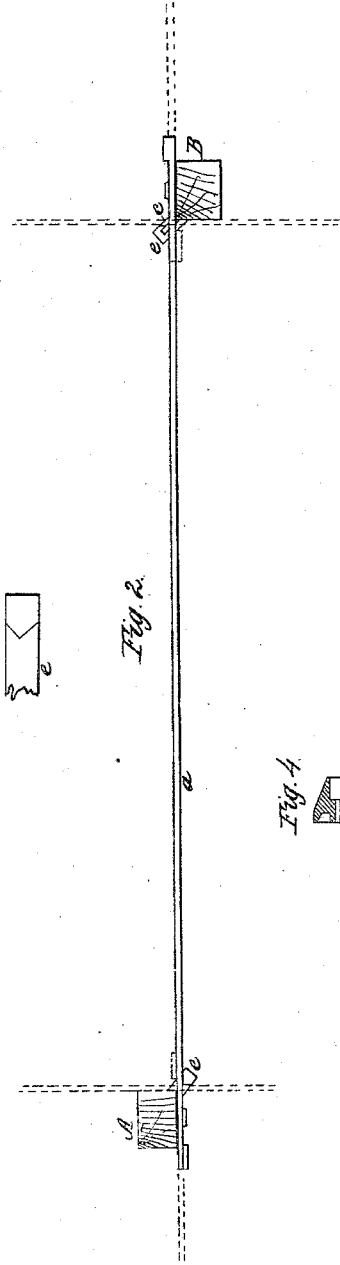
Witnesses:
P. T. Dodge
R. C. Otis
Inventor:
A. Larrowe
By W. E. Dodge, Atty

UNITED STATES PATENT OFFICE.

A. LARROWE, OF COHOCTON, NEW YORK.

IMPROVEMENT IN GATES.

Specification forming part of Letters Patent No. 59,416, dated November 6, 1866.

*To all whom it may concern:*

Be it known that I, A. LARROWE, of Cohocton, in the county of Steuben and State of New York, have invented certain new and useful Improvements in Farm-Gates; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention has for its object the construction of a farm-gate in a very simple and cheap manner, and so as to dispense with the use of hinges.

Figure 1 is a side elevation. Fig. 2 is a top-plan view, and Figs. 3 and 4 are portions detached.

I construct my gate of ordinary fence-boards $a$, to the ends of which are nailed the cross-pieces $b$, the boards $a$ being preferably of uniform width, and placed at equal distances apart, as shown in Fig. 1. The gate, being thus constructed, is placed against the posts A and B, as shown in plan in Fig. 2—that is to say, at one end the gate is on one side of the post, and at the opposite end it is placed on the opposite side of the post.

A wooden hook, $e$, made of any tough wood, is inserted diagonally in each post, as shown in Fig. 1, upon which one of the boards, $a'$, of the gate rests, thereby supporting the gate. These hooks are inserted about midway of the height of the post, and thus serve not only to support the gate, but also to prevent the latter from being pushed outward away from the post at either top or bottom.

A pin, $c$, is inserted in a hole in the post, in a line with the hook $e$, directly over the board $a'$, that rests on the hooks, thus serving to keep the gate from being opened or displaced by being lifted off the hooks.

To the face of the post, directly in rear of the hook $e$, I secure a friction-roller, $n$, as shown in Fig. 1. This roller is so located in relation to the board $a'$ that when the gate is raised slightly at the opposite end the lower edge of the board will rest on the roller, the latter supporting the weight of the gate as it is shoved back.

It will be understood that if it be desired to so arrange the gate as to have it open from either end a friction-roller, $n$, will be applied in the same manner to each of the posts A and B.

By withdrawing the pin $c$ at either end the gate may be lifted off the hook $e$ at that end, and then shoved back half-way, and then swung around, as indicated by the blue lines. It is obvious that when it is thus swung around the board $a'$ will be removed entirely from the roller $n$, and will then rest entirely on the hook $e$. In order that the board $a'$ may readily regain its position on the roller $n$ the latter is made conical at its outer end, as shown in section in Fig. 4. As the gate is swung back to its position for closing, the board $a'$ will ride up the inclined portion of the roller $n$, and will then rest upon the straight portion of the same, in which position it will remain as it is shoved back and forth.

When it is desired to separate small from larger animals, such as hogs or sheep from horses or cattle, it is only necessary to raise the gate up, as shown in red in Fig. 1, and rest one of the lower boards on the hooks $e$.

By these means I produce a gate that can be made very cheaply and quickly, and that can be operated very easily, and with which no hinges are used.

Having thus described my invention, what I claim is—

1. The friction-roller $n$, constructed as shown and described.

2. The combination and arrangement of the roller $n$, hooks $e$, and pins $c$ with a gate constructed and operating as herein shown and described.

A. LARROWE.

Witnesses:
W. C. DODGE,
P. T. DODGE.